Aug. 25, 1970  C. H. SNYDER, JR  3,525,541
QUICK DISCONNECT COUPLING FOR FLANGED CONDUITS
Filed March 24, 1969  2 Sheets-Sheet 1

INVENTOR.
CLIFFORD H. SNYDER, JR.
BY George Raymovich
ATTORNEY

Aug. 25, 1970  C. H. SNYDER, JR  3,525,541
QUICK DISCONNECT COUPLING FOR FLANGED CONDUITS
Filed March 24, 1969  2 Sheets-Sheet 2

INVENTOR.
CLIFFORD H. SNYDER, JR.
BY George Raymonich
ATTORNEY

United States Patent Office 3,525,541
Patented Aug. 25, 1970

3,525,541
QUICK DISCONNECT COUPLING FOR
FLANGED CONDUITS
Clifford H. Snyder, Jr., 173 Rosemont Drive,
Coraopolis, Pa. 15108
Filed Mar. 24, 1969, Ser. No. 809,588
Int. Cl. F16l 35/00
U.S. Cl. 285—82                                    8 Claims

ABSTRACT OF THE DISCLOSURE

A coupling for automatically and releasably connecting a fluid conduit into sealed fluid communication with a flanged pipe is provided wherein a plurality of radially positioned lock pins or lock balls are reciprocal to a position behind the flange of the pipe to prevent the pipe from being pulled out of the coupling. The lock pins are held in place by a lock collar which reciprocates over the pins. A sealing sleeve is resiliently urged against the face of the flange and seals the flange to the body of the coupling. When the lock collar is retracted, the lock pins move radially outwardly thereby releasing the flange. The lock pins are maintained in the radially outward position by a stop ring on the sealing sleeve so that the coupling remains conditioned to receive another flanged conduit.

BACKGROUND OF INVENTION

Many present installations have conduits which have bolted flange connections for removing portions of the conduit. These bolted flange connections require a large number of bolts to be fastened about the periphery of the flange in order to connect the flanged conduits. This type of connection is extremely time consuming.

In many situations, the flanged connection is utilized as a temporary connection and the time involved in connecting the flanges and disconnecting them is a major factor in their use. As an example, many ships have flanged conduits for loading and unloading their cargo and fuel. When the ship comes to port, the flanged conduits must be connected to other flanged conduits on shore to re-fuel the ship and to load or unload liquid cargo.

It has been determined that a great deal of time is consumed in connecting the flanged conduits to each other and, as a consequence, short cuts are taken. In some instances, only a few bolts are put into the flanges and the resulting connection is subject to leakage.

SUMMARY

The present invention is directed to a novel coupling which permits a conduit to be quickly connected to a standard bolted-type flange. The present invention provides a quick disconnect coupling which grips the pipe flange and pulls it into sealing relation with an internal portion of the coupling. The temporary connection of the standard flanged coupling with a fluid conduit can thereby be achieved.

When the requirement for the temporary connection has ended, the coupling of the present invention can be quickly released from the flange by reciprocation of a lock collar which maintains the flange connected to the coupling.

With the foregoing considerations in mind, it is an object of the present invention to provide an improved quick disconnect coupling.

Another object of the present invention is to provide a quick disconnect coupling which permits connection of a fluid conduit to standard flanged pipes, even though the flanges are of various ratings.

These and other objects of the present invention will become apparent as this description proceeds in conjunction with the accompanying drawings.

DESCRIPTION OF THE PREFERRED EMBODIMENT

Figure 1:
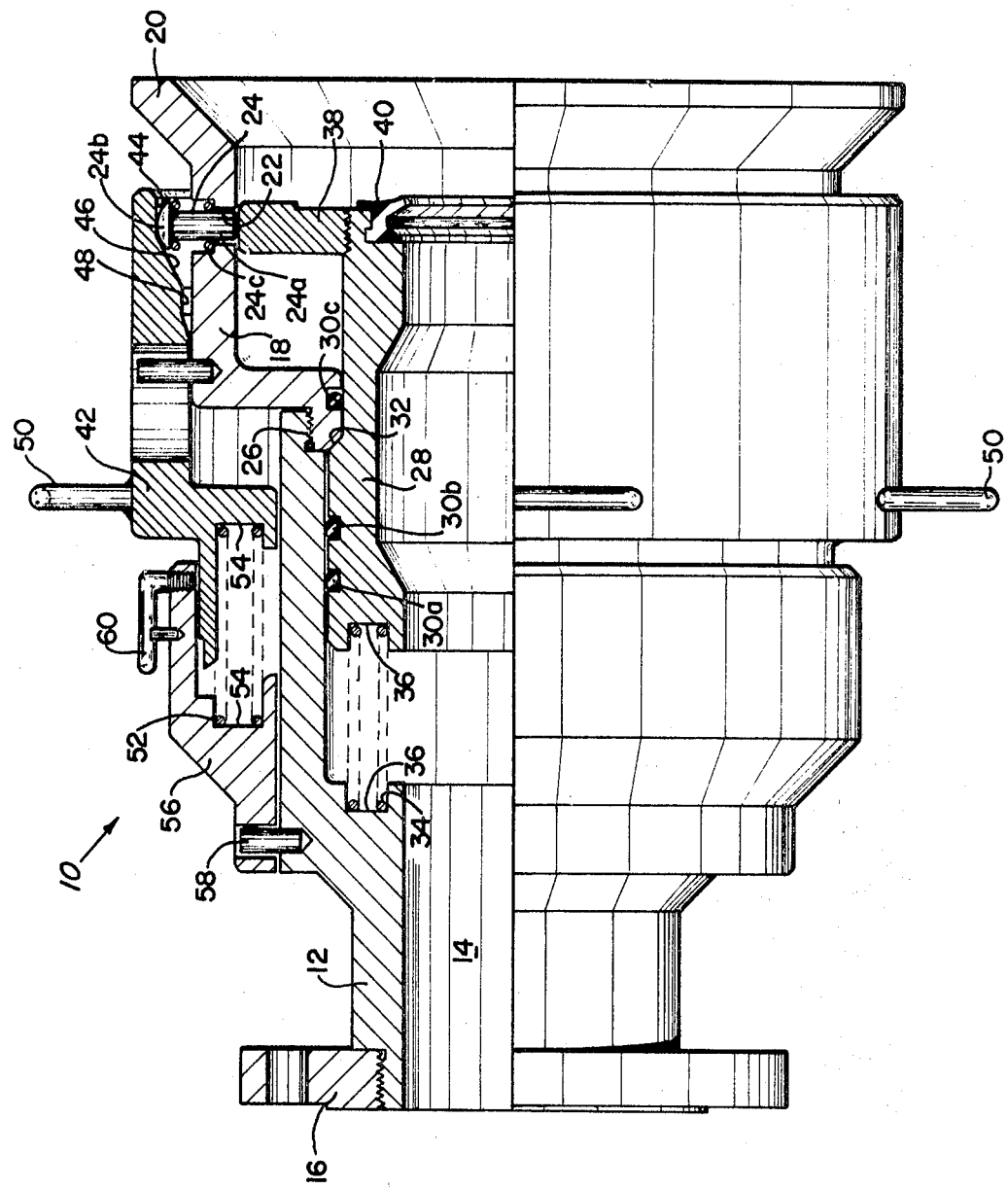
FIG. 1 is a partial section of the coupling of the present invention in the disengaged position.

Referring to the drawings, there is shown a coupling 10 having a body 12 with a fluid passage 14 formed therethrough.

The body 12 may be connected in any manner with a fluid conduit (not shown). The body 12 is permanently connected to the fluid conduit and this may be done by use of a bolted flange 16. In other embodiments, the body 12 could be made integral with a fluid conduit, or there could be a threaded connection to the fluid conduit.

A generally cylindrical flange receiving end portion 18 having a funnel-like end 20 is threaded onto the body 12 by threads 26 so that the end portion 18 is permanently fixed to body 12. The flange receiving end portion 18 has a plurality of equally spaced radial holes 22 formed therethrough about its entire periphery.

A plurality of lock pins 24 are provided so that one lock pin 24 is received within each radial hole 22 formed in the flange receiving end portion 18. The lock pins 24 have a cylindrical body 24a and a rounded head 24b. The rounded head 24b of lock pins 24 is formed as the segment of a sphere. Each lock pin 24 has a helical spring 24c positioned therearound between the lock pin head 24b and the flange receiving end portion 18 so that the lock pins 24 are urged radially outwardly by the helical spring 24c.

Figure 3:
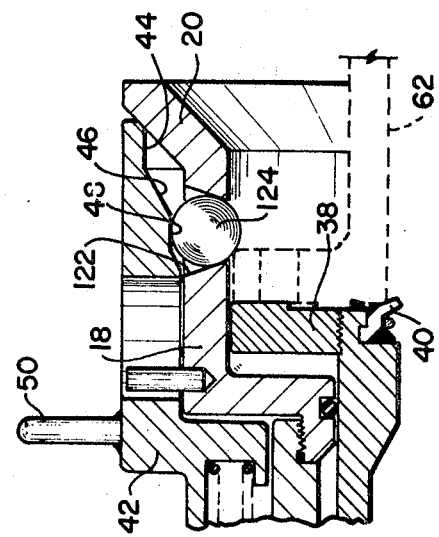
FIG. 3 is a fragmentary portion of FIG. 2 showing lock balls substituted for lock pins.

As shown in FIG. 3, a plurality of lock balls 124 may be substituted for lock pins 24 as some embodiments of the invention. When so substituted, the holes 122 which receive them are conical and the balls 124 reciprocate in the same manner as lock pins 24. The springs 24c are not required with lock balls 124 since the spherical shape of balls 124 causes them to move radially outwardly when the coupling is assembled.

Within the coupling body 12, a generally cylindrical sealing sleeve 28 is positioned in sliding, sealing relation contiguous to the interior wall of body 12. The sealing sleeve 28 carries O-ring seals 30a and 30b which provide a seal between the sleeve 28 and the body 12. The flange receiving end portion 18 carries an O-ring 30c which also seals against the sealing sleeve 28. There is a stop shoulder 32 formed on sealing sleeve 28 for a purpose to be described.

The sealing sleeve 28 is continuously urged toward the flange receiving end portion 18 of the coupling by helical springs 34 which are positioned within a series of blind bores 36 formed within the sealing sleeve 28 and the body 12, respectively. Because of the large diameter of coupling 10, a plurality of equally spaced helical springs 34 are positioned around the periphery of the sealing sleeve 28. A lock pin stop ring 38 is threaded onto the sealing sleeve 28 at the end opposite the helical springs 34.

The sealing sleeve 28 carries a seal ring 40 which seals against the pipe flange received by coupling 10. The seal ring 40 may take various shapes, although the configuration shown in FIGS. 1 and 2 has proved most efficient.

A generally cylindrical lock collar 42 is reciprocally positioned to overlie the flange receiving end portion 18. Lock collar 42 has formed thereon a cylindrical locked pin retaining surface 44, a conical cam surface 46, and a lock pin lock surface 48 to facilitate the coupling operation. The lock collar 42 also has a plurality of handles 50 positioned thereon to facilitate reciprocation of the lock collar.

A plurality of helical springs 52 are positioned within blind bores 54 formed within the lock collar 42 and within an annular housing 56 so that the lock collar 42 is continuously urged away from the annular housing 56. The annular housing 56 is fixed to the coupling body 12 by pins 58.

A lock lever 60 is provided on annular housing 56. The lock lever 60 turns to prevent the lock collar 42 from reciprocating when the coupling is engaged.

Figure 2:
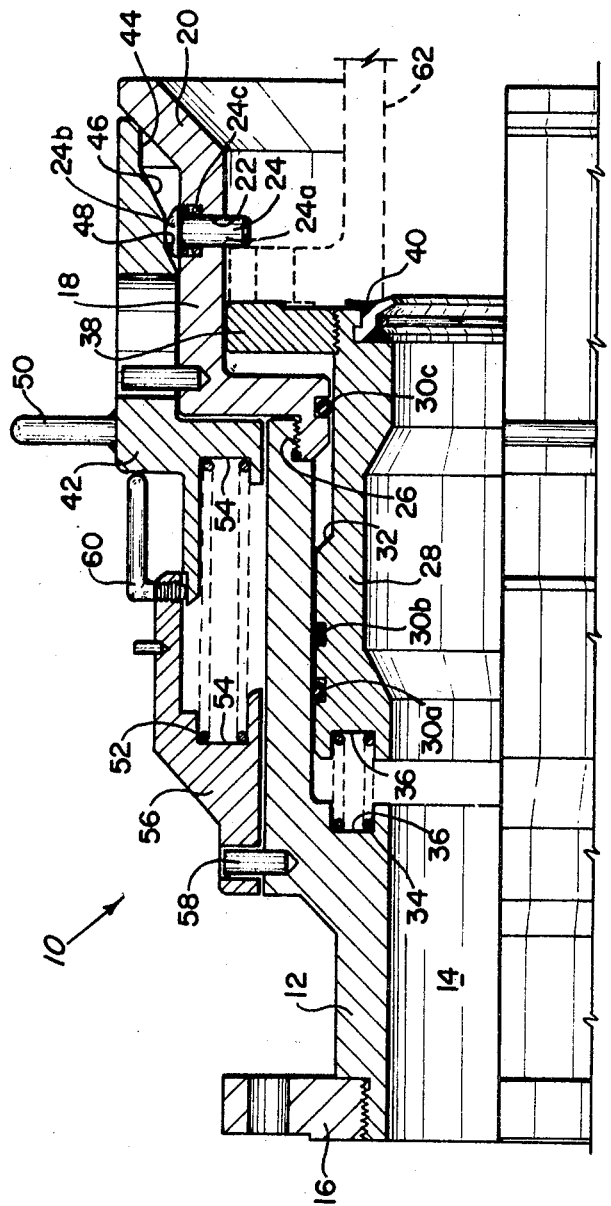
FIG. 2 shows the coupling in the engaged position.

A flanged pipe 62 is shown in phantom lines in FIG. 2 to illustrate the position that the coupling takes when engaged.

OPERATION

The coupling 10 is shown in FIG. 1 in the disengaged position in condition to be engaged. In the disengaged position, the lock collar 42 is retracted. With the lock collar 42 retracted, the lock pin retaining surface 44 on lock collar 42 overlies the lock pins 24. Accordingly, lock pins 24 are permitted to move radially outwardly so that the lock pin stop ring 38 attached to the sealing sleeve 28 moves in under the lock pins 24. In this position, the stop shoulder 32 on sealing sleeve 28 abuts the flange receiving end portion 18 of the coupling and prevents the sleeve 28 from moving beyond the position shown in FIG. 1.

It may be seen that the helical springs 34 urged the sleeve 28 away from body 12 until the stop shoulder 32 abuts the flange receiving end portion 18. At this position, the lock pin stop ring 38 keeps the lock pins 24 in a radially outward position as shown in FIG. 1. With the lock pins 24 forced to the radially outward position, the lock collar 42 is restrained in the retracted position even though the helical springs 52 urge the lock collar 42 over the lock pins 24. It will be noted that the lock balls 124 of FIG. 3 function in the same manner as pins 24.

When the coupling 10 is positioned over a flanged pipe 62 so that the flanged pipe 62 is received within the coupling 10, the flanged pipe 62 contacts the sealing sleeve 28 and the lock pin stop ring 38. The flanged pipe 62 (FIG. 2) is then moved inwardly relative to the coupling 10 until the position shown in FIG. 2 is achieved. When the flanged portion of pipe 62 passes beyond the lock pins 24, the force of helical springs 52 causes the lock collar 42 to move to the right as shown in FIG. 2 so that the cam surface 46 on lock collar 32 forces the lock pins 24 radially inwardly against the force of the small helical springs 24c. As the motion to lock collar 42 continues, the lock pin lock surface 48 on lock collar 32 contacts the lock pins 24 and maintains them in the radially inward position so that they prevent the flange of pipe 62 from being removed from the coupling. At the same time, the sealing sleeve 28, which is being urged against the flange of pipe 62 by helical springs 34, forms a sealing connection between pipe 62 and sealing sleeve 28 through the seal ring 40.

When the flange of pip 62 is received within the coupling 10 and locked therein, the lock lever 60 is turned from the release position shown in FIG. 1 to the lock position shown in FIG. 2 so that the lock collar 42 cannot accidentally be retracted.

When it is desired to disconnect the coupling, the lock lever 60 is released to the position shown in FIG. 1, the handles 50 on lock collar 42 are gripped and the lock collar 42 is retracted to the left as shown in FIG. 2, and the entire coupling 10 is then moved from over flanged conduit 62.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

What is claimed is:

1. A coupling for automatically and releasably connecting a fluid conduit into sealed fluid communication with a flanged pipe, said coupling comprising:
    (a) a generally cylindrical body having a fluid passage therethrough in fluid communication with said conduit;
    (b) a generally cylindrical flange receiving end portion fixed to said body and having a plurality of radial holes formed at spaced intervals about the periphery thereof;
    (c) a plurality of lock means slidingly positioned within each of said radial holes;
    (d) a generally cylindrical sealing sleeve reciprocally positioned within said body in a sliding relation contiguous to the interior wall of said body and means resiliently urging said sealing sleeve toward said flange receiving end portion and seal means positioned between and sealingly engaging said sealing sleeve and said body, said sealing sleeve having flange seal means carried thereby and a lock means stop ring thereon; and
    (e) a generally cylindrical lock collar reciprocally positioned over said flange receiving end portion and having formed thereon a lock means retaining surface, a cam surface, and a lock means lock surface, means resiliently urging said lock collar toward the receiving end of said coupling;

said coupling being positionable in a disengaged position wherein said lock means are retained in a radially outward position by said sealing sleeve lock ring and said lock means bear against said lock collar lock means retaining surface to hold said lock collar in a retracted position against resilient urging and said coupling also being engageable to a flanged pipe wherein the pipe flange sealingly contacts said sealing sleeve and the engaging motion causes said sealing sleeve to move against resilient urging until said flange passes axially inwardly of said lock means thereby permitting said lock sleeve to move over said lock means until said sleeve lock means lock surface holds said lock means in a radially inward position to axially lock said flange within said flange receiving end portion.

2. The coupling of claim 1 wherein said resilient means urging said sealing sleeve towards said flange receiving end portion comprises a plurality of helical springs placed between said sealing sleeve and said coupling body about the periphery of said sealing sleeve.

3. The coupling of claim 1 wherein said resilient means urging said lock collar toward the receiving end of said coupling comprises a plurality of helical springs positioned between said lock collar and an annular housing fixed to said coupling body.

4. The coupling of claim 1 wherein said seal means comprise O-ring seals.

5. The coupling of claim 1 wherein a rotatable lock lever is positioned to lock said lock collar and prevent its reciprocation when said coupling is engaged to a flanged pipe.

6. The coupling of claim 1 wherein said lock means are lock pins that are resiliently urged to a radially outward position by individual helical springs positioned about said lock pins between said lock pin head portions and said flange receiving end portion.

7. The coupling of claim 1 wherein said lock means are lock balls that reciprocate within conical holes formed in said flange receiving end portion.

8. The coupling of claim 1 wherein said sealing sleeve and said lock means stop ring perform the dual function of maintaining the lock means in a radially outward position when said coupling is disengaged and of providing a seal cartridge to seal against said flange when said coupling is engaged.

References Cited

UNITED STATES PATENTS

| | | | |
|---|---|---|---|
| 1,119,276 | 12/1914 | Griffith et al. | 285—316 X |
| 2,279,146 | 4/1942 | Schneller | 285—316 X |
| 2,297,548 | 9/1942 | Fox et al. | 285—316 X |
| 3,228,715 | 1/1966 | Neilon et al. | 285—315 X |
| 3,314,447 | 4/1967 | Collar et al. | 285—316 X |
| 3,407,847 | 10/1968 | Snyder | 285—316 X |

DAVE W. AROLA, Primary Examiner

U.S. Cl. X.R.

285—316